United States Patent [19]

Furusawa et al.

[11] Patent Number: 5,716,448
[45] Date of Patent: Feb. 10, 1998

[54] HYDRAULIC COMPOSITE

[75] Inventors: Takao Furusawa, Chigasaki; Kanji Higaki, Setagaya-ku; Satoshi Okazawa, Chigasaki, all of Japan

[73] Assignee: MBT Holding AG, Zurich, Switzerland

[21] Appl. No.: 888,304

[22] Filed: Jul. 8, 1997

Related U.S. Application Data

[63] Continuation of Ser. No. 498,551, Jul. 5, 1995, abandoned.

[30] Foreign Application Priority Data

Jul. 5, 1994 [JP] Japan ................... 6-153696

[51] Int. Cl.⁶ .................. C04B 14/36; C04B 24/04; C04B 24/10
[52] U.S. Cl. .................. 106/803; 106/694; 106/719; 106/720; 106/811; 106/900
[58] Field of Search .................. 106/719, 720, 106/694, 790, 803, 811, 900

[56] References Cited

U.S. PATENT DOCUMENTS

| | | | |
|---|---|---|---|
| 4,129,449 | 12/1978 | Kojima | 106/662 |
| 4,436,556 | 3/1984 | Kadelka | 106/697 |
| 5,263,797 | 11/1993 | Lindstrom et al. | 405/266 |

FOREIGN PATENT DOCUMENTS

| | | |
|---|---|---|
| 0 045 026 A1 | 7/1981 | European Pat. Off. . |
| 0045026A | 2/1982 | European Pat. Off. . |
| 42 05 354 A1 | 2/1992 | Germany . |
| 2 240 334 | 7/1991 | United Kingdom . |
| WO851500 | 4/1985 | WIPO . |

OTHER PUBLICATIONS

Patent Abstracts of Japan, vol. 018, No. 179, Japanese Patent No. 53-39935 (Dec. 1993).
WPI Database, Section CH, Week 8017, AN 80-30201 CXP002021956 {Japanese Patent No. 55-036218} (Mar. 1980).
WPI Database, Class E19, AN 86-096825 XP002021957 {Japanese Patent No. 61-040854} (Feb. 1986).
Patent Abstracts of Japan, vol. 010, No. 017 (C-324) {Japanese Patent No. 60-170688} (Sep. 1985).
Copy of French Search Report for FR 9508089 dated 23 Dec. 1996.
Chemical Abstract No. 101:115883 which is an abstract of Japanese Patent Specification No. 59-084972 (May 1984).
Chemical Abstract No. 101:115884 which is an abstract of Japanese Patent Specification No. 59-084973 (May 1984).
Chemical Abstract No. 101:115885 which is an abstract of Japanese Patent Specification No. 59-084974 (May 1984).
Chemical Abstract No. 103:109177 which is an abstract of Japanese Patent Specification No. 60-055076 (Mar. 1985).
WPI Abstract Accession No. 84-284530/46 (JP S59-174555) Oct. 1984.
WPI Abstract Accession No. 90-257510/34 (JP H2-180739) Jul. 1990.

*Primary Examiner*—Anthony Green
*Attorney, Agent, or Firm*—Carol A. Loeschorn; Andrew N. Parfomak

[57] ABSTRACT

Excavated earth from construction sites may be recycled as backfilling material or grout by incorporating it into a hydraulic composite. This is done firstly by blending excavated soil with a solidifying quantity of a hydraulic material and a fluidifying quantity of water and at least one first admixture selected from the group consisting of hydroxycarboxylic acids, phosphonic acid derivatives and saccharides and derivatives thereof, and blending the mixture thus created with a cement-dispersing agent at a time between the addition of the hydraulic material and the commencement of set of the hydraulic material. The hydraulic composites thus created have good fluidity, good final strength and low proneness to cracking.

10 Claims, No Drawings

HYDRAULIC COMPOSITE

This application is a continuation application of prior U.S. Ser. No. 08/498,551, filed on Jul. 5, 1995 and now abandoned.

This invention relates to a method of manufacturing a hydraulic composite using excavated soil.

In any sort of building project which involves excavation, there is produced a large quantity of excavated soil (sometimes referred to as "excavation muck" or "construction muck"), disposal of which can give rise to considerable problems. More recently, it has been proposed that this excavated soil may be used as backfilling material or even as construction material. Initial efforts involved the addition to the excavated soil of a hydraulic substance. The problem with this approach is that, when the excavated soil contains a high proportion of clay and silt, sufficient fluidity can only be achieved by the addition of relatively large quantities of water. This has the effect of reducing final strength to an intolerably low level. In addition, the material has high shrinkage and quickly develops large cracks.

A further use of excavated soil is as a component of a grout used in shield tunnelling. Here the method is to convert the excavated soil from the excavation face into a grout by the addition thereto of a solidifying agent (such as cement) and a fluidifying agent and the use of the resulting mixture as a grout. Here again, the clay and silt content of excavated soil causes problems. After mixing, the fluidity of the grout declines rapidly with time and there can be problems with pumping and placement. In addition, large quantities of fluidifying agents are required. Moreover, such grouts do not consume large quantities of excavated soil, which means that there is still a major disposal problem.

It has now been found that it is possible to manufacture a hydraulic composite which utilises effectively large quantities of excavated soil, which retains an appropriate degree of fluidity for a substantial time, which has excellent strength and which exhibits little or no cracking on drying.

There is therefore provided, according to the present invention, a method of manufacturing a hydraulic composite, comprising the steps of 1. blending an excavated soil with a solidifying quantity of a hydraulic material and a fluidifying quantity of water and at least one substance selected from the group consisting of hydroxycarboxylic acids, phosphonic acid derivatives and saccharides and derivatives thereof (hereinafter referred to as "the first admixture"), to create a first mixture; and 2. blending a cement-dispersing agent with this first mixture at a time between the addition of the hydraulic material and the commencement of set of the hydraulic material.

The hydraulic material is any such material known to the art. By "hydraulic material" is meant a material which on the addition of water reacts to form a hard, solid mass. Hydraulic materials which are useful in the working of this invention include the various types of cement, such as portland cement, slag cement and high alumina cement. Such materials are the preferred hydraulic materials, but other materials include quicklime, slaked lime and fine-grained calcined dolomite.

By "solidifying amount" is meant that quantity of hydraulic material which, in conjunction with water and excavated soil, will produce a solid mass. The quantity of hydraulic material will of course be different in different circumstances, depending on the natures of the soil (highly variable), the hydraulic material and the first admixture, but the skilled person can readily ascertain in every case how much constitutes a solidifying amount.

With regard to water content, there should be sufficient water to fluidify the mixture, that is, sufficient to form a fluid mixture but not so much as to prevent solidification. Excavated soil generally contains water, and the skilled person can readily ascertain whether and how much additional water is needed.

The first admixture which is selected from the group consisting of hydroxycarboxylic acids, phosphonic acid derivatives and saccharides and derivatives thereof may be selected from one or more of any such materials known to the art.

Examples of suitable hydroxycarboxylic acids include gluconic acid, glucaric acid, glucoheptonic acid, arabinonic acid, malic acid, citric acid and their salts. The salts include, for example, salts of alkali metals such as sodium and potassium, salts of alkaline earth metals such as calcium and magnesium, and salts of non-metallic materials such as ammonium and triethanolamine. Phosphonic acid derivatives include aminometaphosphonic acid, aminotrimethyl phosphonic acid, methylene phosphonic acid, 1-hydroxyethylidene-1, 1-diphosponic acid, phosphonocarboxylic acid derivatives and their salts. Saccharides and their derivatives include galactose, mannose, xylose, arabinose, and ribose, disaccharides such as maltose, sucrose, and lactose, trisaccharides such as maltotriose and raffinose, and sugar alcohols such as oligosaccharide and sorbitol.

The cement-dispersing agents are preferably water-reducing agents, air-entraining water-reducing agents, high-range water-reducing agents, high-range air-entraining water-reducing agents, and fluidifiers. They include such materials as lignin sulfonic acids, hydroxycarboxylic acids and their salts, saccharides, melamine sulfonate-formaldehyde condensates, naphthalene sulfonate-formaldehyde condensates, polycarboxylic acids, polyalkyl sulfonic acids, aromatic aminosulfonic acids or their derivatives and/or their salts.

There is no limitation on the type of excavated soil which may be used in this invention. Generally, such soil will include such materials as sand, silt and clay.

The relative quantity of the various materials used in the process of this invention may vary according to the natures of these materials, and the skilled person can readily ascertain appropriate proportions in any given case. A solidifying quantity of hydraulic material may readily be determined by simple experimentation on a sample of excavated soil. A typical proportion of first admixture is from 0.01–5% by weight of hydraulic material, but, as hereinabove mentioned, the quantity will depend on the nature of the materials involved, and it will be understood that it is sometimes possible and even desirable to work outside this range. The cement-dispersing agent may generally also be added in a quantity of from 0.01–5% by weight of the hydraulic material, but again it may be possible and/or desirable to work outside this range.

An additional useful component is a water-soluble polymer. Particularly useful examples include cellulose ethers, polyacrylates, polyethylene oxides, Curdlan (a bacterially-produced saccharide) and natural oligosaccharides such as xanthan gum and welan gum.

The invention is readily carried out using conventional materials and equipment. It is quick and convenient (the time between hydraulic material addition and cement-dispersing agent addition is of the order of 5 minutes' maximum.

This invention allows the utilisation of large quantities of excavated soil in a very useful manner. The resultant products are considerably more dimensionally stable than equivalent known products and are less prone to cracking. The invention therefore permits the formulation of backfilling compositions and grouts of good quality. The invention therefore also provides a method of filling an excavated cavity by preparing from soil excavated therefrom and placing a hydraulic composite, wherein said composite is prepared by first blending into the soil to create a first mixture a solidifying quantity of a hydraulic material, a fluidifying quantity of water and at least one substance selected from the group consisting of hydroxycarboxylic acids, phosphonic acid derivatives and saccharides and derivatives thereof, and into this first mixture blending a cement-dispersing agent, this latter blending being carried out at a time between the addition of the hydraulic material and the commencement of set of the hydraulic material.

The invention additionally provides a grout which is a hydraulic composite which comprises excavated soil, a solidifying quantity of hydraulic material, a fluidifying quantity of water, at least one substance selected from the group consisting of hydroxycarboxylic acids, phosphonic acid derivatives and saccharides and derivatives thereof, and a cement-dispersing agent. The invention further provides a method of grouting in a shield tunnelling method wherein an excavation face is grouted with a grout manufactured from excavation earth derived from the excavation face, the grout being prepared from excavation soil by the method of (a) first adding to the excavation soil a solidifying quantity of hydraulic material, a fluidifying quantity of water and at least one substance selected from the group consisting of hydroxycarboxylic acids, phosphonic acid derivatives and saccharides and derivatives thereof, to give a first mixture; and (b) adding to and blending into this first mixture a cement-dispersing agent at a time between the addition of the hydraulic material and the commencement of set of the hydraulic material.

The invention is further illustrated by the following examples.

Materials

The following materials are used to make up a variety of hydraulic composites:

a) Cement: Portland blast-furnace slag cement Class B manufactured by Nihon Cement Co., Ltd.

b) Excavated Soil: Yurakucho Formation Soil No. 1 (clay+silt content 16.1%) and Yurakucho Formation Soil No. 2 (clay+silt content 10.1%). The excavated soil is separated into sand portions and clay+silt portions by washing with water and employing a 75-μm sieve, and is used as a dispersion of clay+silt in water.

c) Bentonite: Kunibond (proprietary name) manufactured by Kunimine Kogyo Co., Ltd.

d) Mixing Water: Tap water e) First Admixture: Seven kinds are used. These are sodium citrate as an oxycarboxylic acid (abbreviated as F1), sodium gluconate (abbreviated as F2), gluconic acid (abbreviated as F3), malic acid (abbreviated as F4), starch syrup as a saccharide (abbreviated as F5), glucose (abbreviated as F6), and methylene phosphonic acid as a phosphonic acid derivative (abbreviated as F7).

f) Cement-dispersing Agent: Four kinds are used. These are sodium melamine sulfonate formaldehyde condensate (abbreviated as R1), sodium naphthalene sulfonate formaldehyde condensate (abbreviated as R2), calcium polycarboxylate ether (abbreviated as R3) and sodium polyalkyl sulfonate (abbreviated as R4).

The mix proportions of hydraulic composites are given in Table 1.

TABLE 1

| Variety of Mix | Type of Excavated Soil | Target Fluidity (mm) | Water-Cement Ratio | Unit Content (kg/m³) | | | | |
|---|---|---|---|---|---|---|---|---|
| | | | | Water | Cement | Excavated Soil | | |
| | | | | | | Clay, Silt | Sand | Bentonite |
| A | Yurakucho Formation Soil No. 1 | 180–210 | 2.00 | 400 | 200 | 186 | 969 | — |
| B | | | 1.62 | 325 | 200 | 219 | 1140 | — |
| C | Yurakucho Formation Soil No. 2 | 180–210 | 1.90 | 380 | 200 | 133 | 1189 | — |
| D | | | 1.62 | 325 | 200 | 150 | 1330 | — |
| E | | | 1.62 | 325 | 200 | 100 | 1330 | 50 |

Test Methods a) Method of Mixing Hydraulic Composite

The first admixture is added to water, cement and excavated soil in a mortar mixer, agitating and mixing are carried out for 2 minutes, after which the cement-dispersing agent is added and agitating and mixing are again carried out for 2 minutes.

b) Time-dependent Change Test of Fluidity of Hydraulic Composite

The hydraulic composite manufactured according to a) is left standing for the designated amount of time, mixed for 30 seconds with the mixer before measurement, and the fluidity is measured by the flow test of JIS (Japanese Industrial Standard) R 5201.

c) Pumpability

Evaluation is made by observing the segregation condition after the flow test by visual inspection. In unsatisfactory situations, the aggregate remians in the pumping hose and eventually clogs it.

d) Compressive Strength

Testing is done according to JIS A 1108.

e) Drying Shrinkage

Testing is done for approximately 3 months using a modified version of JIS A 1129.

Test Results

Test results are given in Table 2 and Table 3. The two tables show the time-dependent changes (mm) in fluidity and unconfined compressive strengths (kgf/cm²) of the individual combinations of the varieties of mix proportions given in Table 1, and first admixtures and cement-dispersing agents. In Table 2, comparison examples are given in Tests No. 1 to No. 10 and examples in Tests No. 11 and 12. The dosages of first admixtures and cement-dispersing agents in the table indicate the percentages of solids by weight of cement. Further, in Table 3, comparison examples are given in Tests No. 13 to No. 15, and examples in Tests No. 16 to No. 42. In this case also, the dosages of first admixtures and cement-dispersing agents indicate the percentages of solids by weight of cement. Further, in Table 2 and Table 3, Comparison Examples No. 13 and No. 14 do not contain first admixtures and cement-dispersing agents and No. 15 contains only cement-dispersing agent.

TABLE 2

| | Test No. | Variety of Mix | First Admixture | | Cement-dispersing agent | | Time-dependent Change in Fluidity (mm) | | | | Compressive Strength (kgf/cm$^2$) | |
|---|---|---|---|---|---|---|---|---|---|---|---|---|
| | | | Kind | Dosage | Kind | Dosage | 0 min | 30 min | 60 min | 90 min | 7-day | 28-day |
| Comparison Example | 1 | A | None | 0 | None | 0 | 194 | 185 | 180 | 176 | 19 | 48 |
| | 2 | B | None | 0 | None | 0 | 159 | — | — | — | 30 | 69 |
| | 3 | B | R2 | 3.0 | None | 0 | 175 | 155 | 135 | 120 | — | — |
| | 4 | B | R1 | 3.0 | None | 0 | 169 | 155 | 132 | 118 | — | — |
| | 5 | B | R2 | 1.0 | R2 | 2.0 | 198 | 168 | 161 | 168 | 31 | 72 |
| | 6 | B | R1 | 1.0 | R1 | 2.0 | 190 | 160 | 158 | 158 | 33 | 74 |
| | 7 | B | F2 | 1.0 | None | 0 | 168 | 166 | 165 | 164 | — | — |
| | 8 | B | F1 | 1.0 | None | 0 | 165 | 164 | 164 | 161 | — | — |
| | 9 | B | R2 + F2 | 3.0 1.0 | None | 0 | 170 | 170 | 168 | 164 | — | — |
| | 10 | B | R1 + F2 | 3.0 1.0 | None | 0 | 168 | 168 | 164 | 162 | — | — |
| Example | 11 | B | F2 | 1.0 | R2 | 2.0 | 198 | 199 | 196 | 196 | 29 | 74 |
| | 12 | B | F1 | 1.0 | R2 | 2.0 | 204 | 209 | 197 | 201 | 29 | 74 |

TABLE 3

| | Test No. | Variety of Mix | First Admixture[1] | | Cement-dispersing agent[1] | | Time-dependent Change in Fluidity (mm) | | | | Compressive Strength (kgf/cm$^2$) | |
|---|---|---|---|---|---|---|---|---|---|---|---|---|
| | | | Kind | Dosage | Kind | Dosage | 0 min | 30 min | 60 min | 90 min | 7-day | 28-day |
| Comparison Example | 13 | C | None | 0 | None | 0 | 200 | 185 | 180 | 173 | 21 | 62 |
| | 14 | D | None | 0 | None | 0 | 130 | — | — | — | 40 | 84 |
| | 15 | D | None | 0 | R2 | 4.0 | 194 | 187 | 144 | 132 | 36 | 82 |
| Example | 16 | D | F1 | 1.0 | R1 | 3.0 | 188 | 188 | 186 | 183 | — | — |
| | 17 | D | F1 | 1.0 | R2 | 3.0 | 198 | 198 | 196 | 194 | 31 | 84 |
| | 18 | D | F1 | 1.0 | R3 | 2.5 | 206 | 204 | 205 | 204 | — | — |
| | 19 | D | F1 | 1.0 | R4 | 2.5 | 202 | 202 | 200 | 200 | — | — |
| | 20 | D | F2 | 1.0 | R1 | 3.0 | 188 | 186 | 186 | 182 | 36 | 85 |
| | 21 | D | F2 | 0.05 | R2 | 3.0 | 186 | 180 | 153 | 142 | 38 | 81 |
| | 22 | D | F2 | 1.0 | R2 | 3.0 | 191 | 188 | 186 | 180 | 31 | 82 |
| | 23 | D | F2 | 2.5 | R2 | 3.0 | 200 | 200 | 196 | 196 | 24 | 80 |
| | 24 | D | F2 | 5.0 | R2 | 3.0 | 208 | 208 | 208 | 206 | 20 | 83 |
| | 25 | D | F2 | 1.0 | R3 | 2.5 | 206 | 198 | 200 | 194 | 20 | 75 |
| | 26 | D | F2 | 1.0 | R4 | 2.5 | 201 | 201 | 195 | 194 | 29 | 81 |
| | 27 | D | F3 | 1.0 | R2 | 3.0 | 196 | 196 | 194 | 192 | 32 | 84 |
| | 28 | D | F4 | 1.0 | R2 | 3.0 | 200 | 201 | 198 | 198 | 30 | 81 |
| | 29 | D | F5 | 1.5 | R1 | 3.0 | 190 | 190 | 188 | 185 | — | — |
| | 30 | D | F5 | 1.5 | R2 | 3.0 | 199 | 197 | 192 | 190 | 31 | 86 |
| | 31 | D | F5 | 1.5 | R3 | 2.5 | 201 | 202 | 199 | 195 | — | — |
| | 32 | D | F5 | 1.5 | R4 | 2.5 | 208 | 208 | 205 | 201 | — | — |
| | 33 | D | F6 | 1.0 | R2 | 3.0 | 203 | 200 | 200 | 198 | 34 | 83 |
| | 34 | D | F7 | 1.0 | R1 | 3.0 | 180 | 180 | 179 | 178 | — | — |
| | 35 | D | F7 | 1.0 | R2 | 3.0 | 186 | 186 | 184 | 183 | 30 | 86 |
| | 36 | D | F7 | 1.0 | R3 | 2.5 | 192 | 191 | 192 | 188 | — | — |
| | 37 | D | F7 | 1.0 | R4 | 2.5 | 196 | 196 | 195 | 191 | — | — |
| | 38 | D | F1 + F2 | 0.5 0.5 | R2 | 3.0 | 196 | 190 | 190 | 184 | 30 | 86 |
| | 39 | D | F2 + F7 | 0.5 0.5 | R2 | 3.0 | 184 | 182 | 180 | 180 | 32 | 88 |
| | 40 | D | F2 | 1.0 | R1 + R2 | 1.5 1.5 | 192 | 190 | 187 | 186 | 31 | 82 |
| | 41 | D | F1 | 1.0 | R1 + R2 | 1.5 1.5 | 194 | 194 | 190 | 189 | 32 | 83 |
| | 42 | E | F1 | 1.0 | R2 | 3.0 | 202 | 201 | 199 | 196 | 33 | 84 |

[1] admixture dosage is indicated by weight solids on cement weight

Time-dependent Change in Fluidity of Hydraulic Composite

In comparisons of Tests No. 2 to No. 10 and Tests No. 13 to No. 15 (comparison examples), when Tests No. 11, No. 12 and No. 16 to No. 42 (examples) are examined, the desired fluidities are found to have been obtained after finishing mixing with, moreover, after elapse of 90 minutes, almost no decline in fluidity in comparison with conventional technology. In Test No. 21 (example) the dosage of first admixture is lower and it is seen that the length of time in which fluidity is maintained is shortened.

Pumpability

Tests No. 11, No. 12 and No. 16 to No. 42 (examples) show no segregation compared with conventional technology and it is seen that there is no problem with pumpability.

Compressive Strength

In comparison with Tests No. 1 and No. 13 (comparison examples), increases in compressive strengths were seen in all of Tests No. 11, No. 12 and Tests No. 17, No. 20 to No. 28, No. 30, No. 34, No. 37 to No. 42 (examples).

Drying Shrinkage

Length changes are measured on curing indoors at a humidity of 60%. The rate of length change in Test No. 11 at 30-day age is $4.2 \times 10^{-3}$, and there is hardly any change after that. This value is higher than the change rate for a concrete material, but is not high for a soil cement material. Furthermore, one of the features is that stabilising of the rate of change is observed.

We claim:

1. A method of manufacturing a hydraulic composite, comprising the steps of:

A. blending an excavated soil with a solidifying quantity of a hydraulic material and a fluidifying quantity of water and at least one admixture selected from the group consisting of hydroxycarboxylic acids, phosphonic acid derivatives and saccharides and derivatives thereof, to create a first mixture; and B. blending a cement-dispersing agent with said first mixture before the commencement of set of the hydraulic material.

2. A method according to claim 1, wherein the admixture is present to the extent of from 0.01–5% by weight of the hydraulic material.

3. A method according to claim 1, wherein the cement-dispersing agent is present to the extent of from 0.01–5% by weight of the hydraulic material.

4. A method according to claim 1 wherein said cement dispersing agent is selected from the group consisting of lignin sulfonic acids, hydroxycarboxylic acids and their salts, saccharides, melamine sulfonate-formaldehyde condensates, naphthalene sulfonate-formaldehyde condensates, polycarboxylic acids, polyalkyl sulfonic acids, aromatic aminosulfonic acids and mixtures thereof.

5. A method according to claim 1 wherein the cement dispersing agent is selected from the group consisting of sodium melamine sulfonate formaldehyde condensate, sodium naphthalene sulfonate formaldehyde condensate, calcium polycarboxylate ether, sodium polyalkyl sulfonate and mixtures thereof.

6. A method according to claim 1 wherein the hydraulic material is selected from the group consisting of cement, quicklime, slaked lime and fine-grained calcined dolomite.

7. A method according to claim 6 wherein said cement is selected from the group consisting of portland cement, slag cement and high alumina cement.

8. A method according to claim 1 wherein the admixture is blended in an amount of 0.01 to 5% by weight based on the weight of the hydraulic material.

9. A method according to claim 1 wherein the cement dispersing agent is blended in an amount of 0.01 to 5% by weight based on the weight of the hydraulic material.

10. A grout which is a hydraulic composite which comprises excavated soil, a solidifying quantity of hydraulic material, a fluidifying quantity of water, at least one substance selected from the group consisting of hydroxycarboxylic acids, phosphonic acid derivatives and saccharides and derivatives thereof, and a cement-dispersing agent.

* * * * *